July 6, 1965

T. L. ATKINSON 3,193,142

LAWN SPREADER

Filed Aug. 26, 1963

INVENTOR.
TRUMAN L. ATKINSON
BY
ATTORNEYS

United States Patent Office 3,193,142
Patented July 6, 1965

3,193,142
LAWN SPREADER
Truman L. Atkinson, 609 Lake Shore Drive,
Ludington, Mich.
Filed Aug. 26, 1963, Ser. No. 304,426
10 Claims. (Cl. 222—41)

This invention relates to lawn spreaders. More particularly, this invention relates to an improved lawn spreader of a construction such that one is able to clean the spreader much more conveniently.

This application is an improvement of my co-pending application Serial No. 110,535, filed May 16, 1961, and entitled Lawn Spreader and now Patent No. 3,122,273. As was disclosed in that application, many types of lawn spreaders are presently in existence, these spreaders utilized to distribute materials such as fertilizer, weed killer or seed over the ground. One problem which has been encountered in such lawn spreaders is that the material, for example fertilizer, collects in the area between the gate and the bottom of the spreader hopper. Gates on such spreaders operate to progressively open and close apertures to regulate the quantity of material distributed. If the material collects in this area, the apertures may become plugged and the operation of the gate sluggish and inaccurate. Therefore, this area must be kept clean. To clean existing gate structures it is necessary to remove screws and remove the gate to gain access to the area which needs cleaning. This requires the use of tools and also takes considerable time, and often the user of the lawn spreader neglects to perform the proper and necessary cleaning operations. Materials built up and as a result the spreader fails to operate properly and evenly and does not distribute the proper quantity of material. Further, enough material will collect after a period of time so that the gate itself will buckle, this resulting in permanent damage to the spreader. In my co-pending application, a structure was set forth which solved many of these problems.

The present invention also overcomes these difficulties by providing a structure having a gate which may be quickly and simply removed from the bottom of the hopper. The cleaning operation can be accomplished without the necessity of tools and can be done in a very short time. It is therefore an object of this invention to provide a lawn spreader which has an improved means of attaching a gate to the hopper facilitating easy removal and cleaning of the apparatus.

A further object of this invention is the provision of such a lawn spreader achieving the above results, yet maintaining a simplicity of structure allowing ease of operation, inexpensiveness in fabrication and durability in performance.

These and other objects of this invention will become apparent to those skilled in the relevant arts upon reading the following specification in conjunction with the accompanying drawings, wherein.

Briefly, this invention relates to a lawn spreader having a hopper adapted to receive material to be spread, an axle journaled adjacent the bottom of the hopper and having wheels for transporting it. Handle means are affixed to the hopper for moving it, apertures formed in the bottom thereof for discharging material. A gate having a shutter plate conforming to the bottom of the hopper covers the apertures. Members are affixed to the ends of the gate, the members each having a slot therein receiving the axle adjacent its ends, bracket means holding the gate against the bottom of the hopper. Control means are associated with the gate for moving it and the shutter plate to progressively uncover the apertures and regulate discharge of material therefrom. The gate is movable through the control means to a point where the shutter plate is released from the bracket means and the gate is removable from the bottom of the hopper as the axle moves in the slots.

Figure 1:
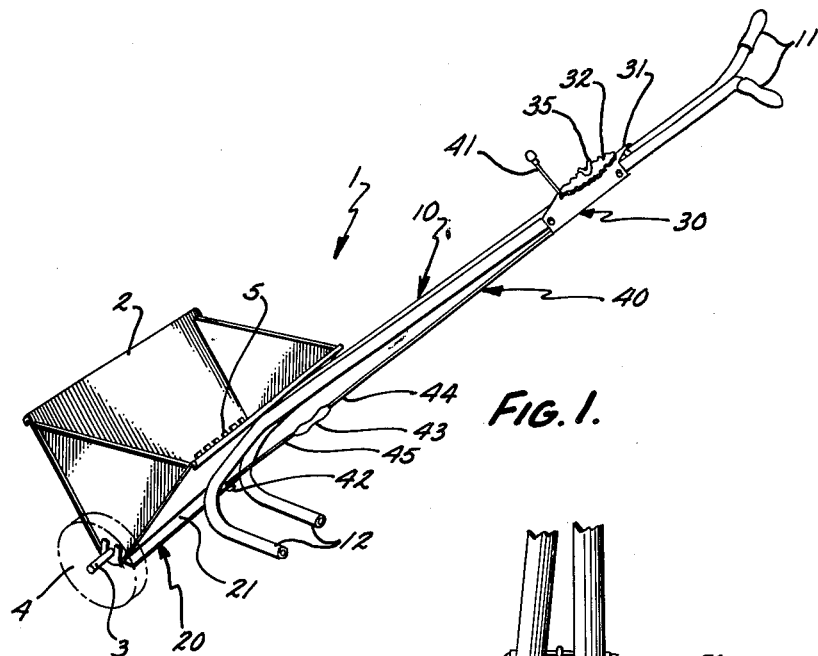
FIG. 1 is a perspective view of an embodiment of the lawn spreader of this invention.
Figure 6:
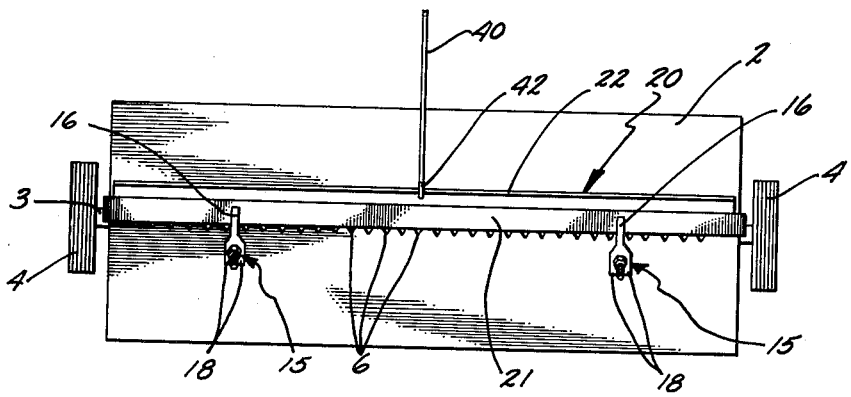
FIG. 6 is a bottom view thereof.

Referring more specifically to the drawing, the reference numeral 1 designates an embodiment of a lawn spreader made in accordance with the teachings of this invention (FIG. 1). The spreader 1 includes a hopper 2, a handle 10, a bracket means 15, a gate 20 and a control means 30 (FIGS. 1 and 6). The hopper 2 is shaped to a configuration directing materials placed therein to the bottom thereof. An axle 3 extends rotatably through the lower portion of each side wall of the hopper 2 in a conventional manner. A wheel 4 is affixed to each end of the axle 3 to allow movement of the hopper along the ground. An agitating mechanism 5 is associated with the axle 3 within the hopper 2, forcing materials from the bottom thereof through the apertures 6 formed along the bottom of the hopper 2. The handle 10 is affixed to the back of the hopper 2, the handle 10 including handle bars 11 for pushing the spreader along the ground, and feet 12 for facilitating the free standing of the spreader.

Figure 5:
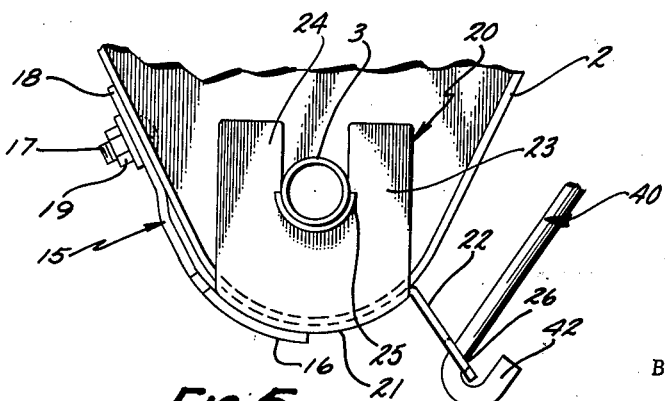
FIG. 5 is an enlarged, side view of the lower portion of the lawn spreader.

A bracket means 15 is secured to the bottom of the hopper 2 (FIGS. 5 and 6). In the embodiment shown, the bracket means includes a pair of Y-shaped brackets, the lower tails 16 thereof spaced slightly from the bottom of the hopper to accommodate the gate 20 which will be described more fully hereinafter. Bolts 17 extend through the lower portion of the front of the hopper 2, the bolts extending between the arms 18 of the brackets 15. Nuts 19 hold the brackets 15 in position and it will be noted that exact positioning of the brackets may be obtained with respect to the bottom of the hopper 2, this positioning being dependent on the positioning of the nuts 19 with respect to the arms 18 of the brackets 15.

Figure 4:
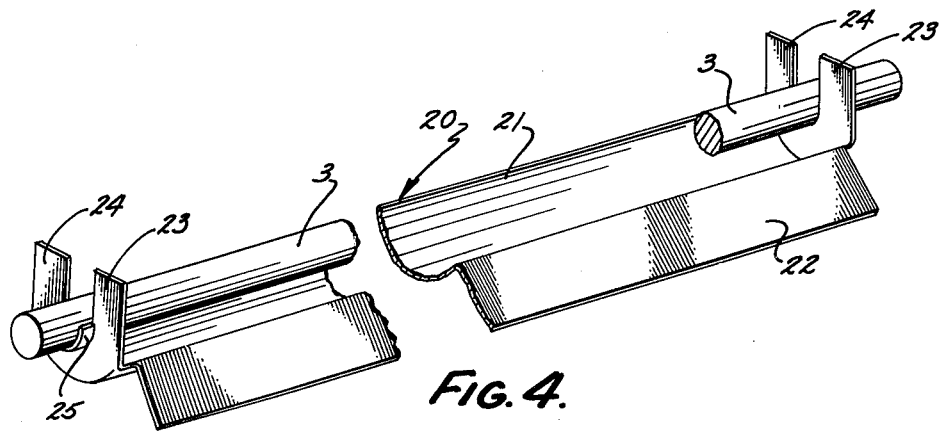
FIG. 4 is a perspective view of the gate utilized in this lawn spreader.

The gate 20 (FIGS. 4–6) includes a shutter plate 21 shaped to conform with the bottom of the hopper 2. A flange 22 depends from the edge of the shutter plate 21. A member 23 extends upwardly from each end of the shutter plate 21, each member including a slot 24, the slot terminating in the thickened area 25. The slots are of a size such that they will accommodate the axle 3 as shown. An opening 26 is provided at generally the middle of the flange 22. It will now be seen that the shutter plate 21 of the gate 20 is positioned against the bottom of the hopper 2 for covering of the apertures 6 therein. The shutter plate 21 is held snugly against the bottom of the hopper 2 by means of the tails 16 of the brackets 15, the tails 16 being of a width such that they lie between a pair of apertures 6. The slots 24 in the members 23 at the ends of the gate 20 receive the axle 3 in the area between the hopper 2 and the wheels 4, the thickened portions 25 bearing the added wear caused by the rotation of the axle 3 thereagainst.

Figure 2:
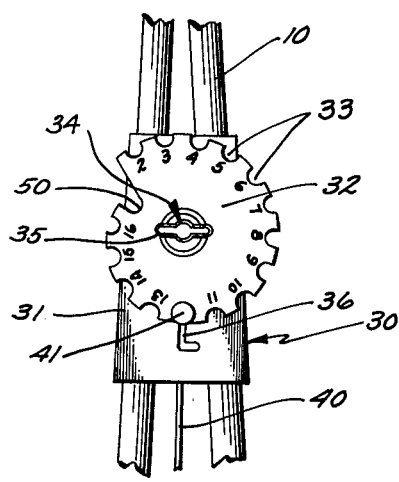
FIG. 2 is a plan view of the top of the control means of this lawn spreader.
Figure 3:
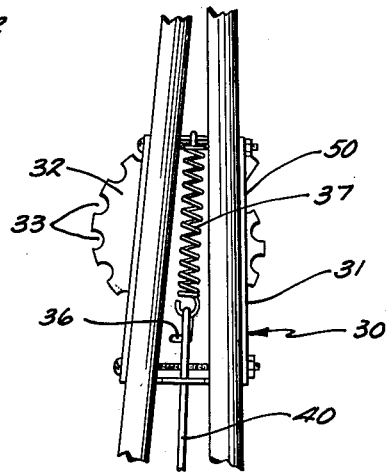
FIG. 3 is a bottom view of the control means shown in FIG. 2.

The control means 30 includes a plate 31 secured to the upper portion of the handle 10 (FIGS. 1–3). A disk 32, having a plurality of indentations of varying depth 33 formed around its circumference is rotatably secured to the top of the plate 31 by means of a threaded bolt 34 having an enlarged head 35. When the head 35 is rotated in one direction, the disk 32 may be rotated. However, when the head 35 of bolt 34 is rotated in the other direction, the head 35 affixes the disk 32 with respect to the plate 31 of control means 30. An L-shaped slot 36 is formed in the plate 31. The upstanding end 41 of the control rod 40 extends through the slot 36, adapted to slide therein and therealong. As shown in FIG. 3, the spring 37 is secured to the plate 31, lying on the underside thereof and attached to the end 41 of the rod 40. It will be noted that the spring 37 at all times biases the end 41 of the rod 40 toward the disk 32. The other end 42 of the rod 40 is hooked and secured within the hole 26 in the flange 22 of the gate 20 (FIG. 5). A turnbuckle 43 is associated with the control rod 40, the rod 40 being threaded at 44 and 45 at each side of the turnbuckle. Such structure is already known to the art, it being understood that rotation of the turnbuckle 43 either shortens or lengthens the rod 40.

*Assembly and operation*

The lawn spreader 1 is assembled as follows. The brackets 15 are secured to the bottom of the hopper 2 as best shown in FIGS. 5 and 6, the bolts 17 extending between the arms 18 thereof, the nuts 19 holding the brackets to the hopper. The tails 16 of the brackets 15 lie between pairs of apertures 6 in the bottom of the hopper 2 and are spaced a short distance therefrom. The shutter plate 21 of the gate 20 is positioned against the bottom of the hopper 2, extending under the tails 16 of the brackets 15. The slots 24 of the members 23 at the ends of the gate 20 receive the axle 3 adjacent its ends between the wheels 4 and the hopper 2. The end 41 of the control rod 40 extends into the slot 36 of the plate 31 of the control means 30. The other end of the control rod 40 is secured to the flange 22 of the gate 20. The spring 37 biases the control rod toward the disk 32, the control rod thus exerting a constant pull on the flange 22 of the gate 20.

In operation, the turnbuckle 43 adjusts the length of the rod to correspond with the various indentations 33 in the disk 32 and the apertures 6 in the bottom of the hopper 2 as follows. The indentations 33 vary in depth as best shown in FIG. 2. When the disk 32 is rotated as described and the indentation of least depth is aligned with the upstanding portion of the L-shaped slot 36, the spring 37 will bias the end 41 of the control rod 40 into that indentation. This means that the spring 37 will be expanded and the control rod 40 will move the gate 20 downwardly to cover the apertures 6. The rod is then adjusted to be of a length such that a very small portion of the apertures 6 are exposed at the edge of the shutter plate 21. If the end 41 of the rod 40 is pulled further against the spring 37 and inserted into the foot of the L-shaped slot 36, the apertures are completely closed by the shutter plate 21. It will thus be noted that as the disk 32 is rotated so that the end 41 of the rod 40 is biased into indentations 33 of increasing depth, larger portions of the apertures 6 are exposed because the spring 37 draws the gate 20 and thus the shutter plate 21 to expose the apertures 6.

One indentation designated by the reference numeral 50 is of such an increased depth that when the end 41 of the rod 40 is inserted therein, the spring 37 pulls the gate 20 so far over the apertures 6 that the shutter plate 21 becomes disengaged from the tails 16 of the brackets 15. At this point, it will be noted that the entire gate is removable from the hopper 2, the axle 3 sliding out of the slots 24 in the members 23 at the ends of the gate 20. In this position, the bottom of the hopper 2, including the apertures 6 may be thoroughly cleaned. Further, the gate itself including the shutter plate 21 may also be thoroughly cleaned. When thus cleaned, the gate 20 is again positioned against the bottom of the hopper 2, the shutter plate 21 slid beneath the tails 16 of the brackets 15 and the disk 32 rotated to any position other than a position where the indentation 50 can receive the end 41 of the control rod 40. When the end 41 of the control rod 40 is in any one of the indentations 33 other than the indentation 50, the shutter plate 21 cannot become disengaged from the tails 16 of the brackets 15.

Once the length of the control rod 40 is set through the turnbuckle 43, and once the brackets 15 are properly positioned with respect to the indentation 50, no further adjustments or settings are necessary. The amount of material distributed by the spreader 1 is determined quickly and simply by which indentation 33 receives the end 41 of the control rod 40. Nothing is spread if the end 41 of the control rod 40 is positioned in the foot of the L-shaped slot 36. If the end 41 of the control rod 40 is positioned in the indentation 50, the entire gate 20 is disengaged from the hopper 2 for cleaning as described.

It will now be seen that this invention has provided an improved lawn spreader having an improved means for removing the gate from the bottom of the hopper so that the hopper and the gate may be thoroughly cleaned. This may be achieved quickly and simply, no tools of any kind being required. The removal of the gate is so simple that even a child can accomplish it, and no settings or adjustments are necessary to remove and replace the gate again and again. These results are achieved through a structure which has retained simplicity, is easily and inexpensively fabricated and easily operated.

While only one embodiment of this invention has been shown and described, it may be possible to practice the invention through the utilization of certain other embodiments without departing from the spirit and scope thereof. Such other embodiments are to be included as part of this invention unless the following claims specifically state otherwise.

I claim:

1. A lawn spreader, comprising: a hopper adapted to receive material to be spread; an axle journaled adjacent the bottom of said hopper and having wheel means for transporting said hopper; handle means fixed to said hopper for moving said hopper; apertures formed in the bottom of said hopper for discharging material; a gate including a shutter plate conforming to the bottom of said hopper and covering said apertures; members affixed to the ends of said gate, said members each having a slot therein receiving said axle adjacent its ends; bracket means holding said gate against said bottom of said hopper; control means associated with said gate for moving said gate and said shutter plate to progressively uncover said apertures and regulate discharge of material therefrom, said gate movable through said control means to a point where said shutter plate is released from said bracket means and said gate is removable from said bottom of said hopper as said axle moves in said slots.

2. A lawn spreader as defined in claim 1, said control means comprising a control rod secured to said gate and extending along said handle means, the other end of said control rod associated with an element determining the positioning of said gate.

3. A lawn spreader as defined in claim 2, wherein the length of said control rod is adjustable.

4. A lawn spreader as defined in claim 2, said element being disk-like and rotatable and having a plurality of indentations of varying depth at its edges, said other end of said control rod biased to rest in said indentations.

5. A lawn spreader, comprising: a hopper adapted to receive material to be spread; an axle journaled adjacent the bottom of said hopper and having wheel means for transporting said hopper; handle means fixed to said hopper for moving said hopper; apertures formed in the bottom of said hopper for discharging material; a gate including a shutter plate conforming to the bottom of said hopper and covering said apertures; members affixed to the ends of said gate, said members each having a slot therein receiving said axle adjacent its ends; at least two brackets secured adjacent said bottom of said hopper holding said gate against said bottom of said hopper, said brackets being elongated and extending between pairs of said apertures; control means associated with said gate for moving said gate and said shutter plate to progressively uncover said apertures and regulate discharge of material therefrom, said gate movable through said control means to a point where said shutter plate is released from said brackets and said gate is removable from said bottom of said hopper as said axle moves in said slots.

6. A lawn spreader as defined in claim 5, each of said brackets being generally Y-shaped, the bottom tail thereof extending between a pair of said apertures and a bolt extending between the top arms thereof said bracket to said bottom of said hopper.

7. A lawn spreader, comprising: a hopper adapted to receive material to be spread; an axle journaled adjacent the bottom of said hopper and having wheel means for transporting said hopper; handle means fixed to said hopper for moving said hopper; apertures formed in the bottom of said hopper for discharging material; a gate including a shutter plate conforming to the bottom of said hopper and covering said apertures; members affixed to the ends of said gate, said members each having a slot therein receiving said axle adjacent its ends; at least two brackets secured adjacent said bottom of said hopper holding said gate against said bottom of said hopper, said brackets being elongated and extending between pairs of said apertures; control means associated with said gate for moving said gate and said shutter plate to progressively uncover said apertures and regulate discharge of material therefrom; said control means including a control rod secured to said gate and extending along said handle means, the other end of said control rod associated with an element determining the positioning of said gate and said gate movable through said control means to a point where said shutter plate is released from said brackets and said gate is removable from said bottom of said hopper as said axle moves in said slots.

8. A lawn spreader as defined in claim 7, said element being disk-like and rotatable and having a plurality of indentations of varying depth at its edges, said other end of said control rod biased to rest in said indentations.

9. A lawn spreader, comprising: a hopper adapted to receive material to be spread; an axle journaled adjacent the bottom of said hopper and having wheel means for transporting said hopper; handle means fixed to said hopper for moving said hopper; apertures formed in the bottom of said hopper for discharging material; a gate including a shutter plate conforming to the bottom of said hopper and covering said apertures; members affixed to the ends of said gate, said members each having a slot therein receiving said axle adjacent its ends; at least two brackets secured adjacent said bottom of said hopper holding said gate against said bottom of said hopper, said brackets being elongated and extending between pairs of said apertures; control means associated with said gate for moving said gate and said shutter plate to progressively uncover said apertures and regulate discharge of material therefrom; said control means including a control rod of adjustable length secured to said gate and extending along said handle means, the other end of said control rod associated with an element determining the positioning of said gate, said element being disk-like and rotatable and having a plurality of indentations of varying depth at its edges, a spring enveloping said other end of said control rod and fixed to bias said other end of said control rod to rest in said indentations; and said gate movable through said control means to a point where said shutter plate is released from said brackets and said gate is removable from said bottom of said hopper as said axle moves in said slots.

10. A lawn spreader as defined in claim 9, each of said brackets being generally Y-shaped, the bottom tail thereof extending between a pair of said apertures and a bolt extending between the top arms thereof securing said bracket to said bottom of said hopper.

References Cited by the Examiner
UNITED STATES PATENTS

| | | | |
|---|---|---|---|
| 1,948,861 | 2/34 | Lindgren | 222—311 X |
| 1,957,594 | 5/34 | Helm | 222—177 X |
| 3,015,416 | 1/62 | Peoples et al. | 222—41 |

LOUIS J. DEMBO, *Primary Examiner.*